3,108,100
POLYMERIZATION OF ORGANIC ISOCYANATES WITH ORGANIC HYDROXIDES
Francis Edward Gervase Tate and James Harry Wild, Manchester, England, assignors to Imperial Chemical Industries Limited, London, England, a corporation of Great Britain
No Drawing. Filed June 9, 1958, Ser. No. 740,580
Claims priority, application Great Britain June 12, 1957
9 Claims. (Cl. 260—248)

This invention relates to the polymerization of organic isocyanates.

It has already been proposed to use a variety of catalysts for the polymerization of organic diisocyanates and an even greater variety of catalysts have been proposed for the polymerization of organic monoisocyanates. Two types of polymers from the monoisocyanates have been prepared, namely the dimers (substituted uretediones) of the general formula

and the trimers (isocyanuric acid derivatives) of the general formula

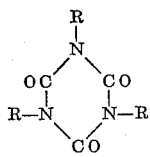

We have now found that certain organic bases are especially valuable catalysts for the rapid polymerization of organic isocyanates and that these catalysts favor the formation of the trimeric form of the polymer, that is to say the isocyanurate type of polymer.

Thus according to the present invention we provide a process for the manufacture of polymeric organic isocyanates which comprises contacting an organic isocyanate with at least one organic base containing a hydroxyl ion.

The organic base to be used as catalyst may be, for example, a quaternary hydroxide derived from nitrogen, phosphorus, arsenic, or antimony or a ternary hydroxide derived from sulphur or selenium, wherein the substituents on the nitrogen, sulphur or other hetero-atom may be alkyl, aryl, or aralkyl groups or any mixture of such groups, or any other organic compound which contains a hydroxyl ion.

As specific examples of such organic bases there may be mentioned tetraethylammonium hydroxide, benzyltrimethyl ammonium hydroxide, tetraethylphosphonium hydroxide, trimethylsulphonium hydroxide and tri-dipyridylferrous dihydroxide.

Any organic isocyanate or mixture of isocyanates may be polymerized according to the process of the present invention. Examples of such isocyanates are monoisocyanates are monoisocyanates such as phenyl isocyanate, p-tolyl isocyanate, o-methoxyphenyl isocyanate, o-chlorophenyl isocyanate, p-chlorophenyl isocyanate, p-nitrophenyl isocyanate, and n-hexadecyl isocyanate, or polyisocyanates such as p-phenylene diisocyanate, 1-methoxyphenylene-2:4-diisocyanate, 3:3'-dimethyl-4:4'-diisocyanatodiphenylmethane, diphenylene-4:4'-diisocyanate, 4:4'-diisocyanatodiphenyl ether, naphthylene-1:5-diisocyanate, hexamethylene diisocyanate, diisocyanatodicyclohexyl methane, p-xylylene diisocyanate, toluene-2:4:6-triisocyanate, 3-methyl-4:6:4'-triisocyanatodiphenylmethane, 2:4:4'-triisocyanatodiphenyl, 2:4:4'-triisocyanatodiphenyl ether. Organic diisocyanates that may especially advantageously be polymerized according to the process of the present invention are 2:4- and 2:6-tolylene diisocyanates and mixtures thereof, diisocyanatodiphenylmethane, m-phenylene diisocyanate, chlorophenylene diisocyanate, and m-xylylene diisocyanate. The isocyanurate polymer forms of these diisocyanates are especially readily made by means of the catalysts used in the process of this invention, and these polymers may advantageously be used in a wide variety of processes in place of the parent diisocyanates.

When an aromatic di- or other polyisocyanate is used which contains an isocyanate group with a further substituent ortho to it the rate of polymerization of this last isocyanate group will be much slower than that of other groups which are not so hindered.

The polymerization process may be performed at temperatures of from −10° C. to the temperature at which the catalyst used decomposes, but it is usually preferable to carry out these reactions at or about atmospheric temperature. When desired, solvents which are inert to the isocyanate may be present and the addition of such solvents may be used to moderate the rate of the reaction if so desired. Suitable solvents are esters such as ethyl acetate and butyl acetate, ketones such as acetone and methyl ethyl ketone, chloroform, benzene, toluene, xylene, monochlorbenzene, o-dichlorbenzene, ethers such as diethyl and dibutyl ether and petroleum ethers. The polymerization is exothermic and the amount of catalyst used will vary with the nature of the isocyanate involved, the amount of solvent present and the rate at which polymerization is to take place. In general the amount used is from 0.0001 to 5 percent by weight of the isocyanate used. The catalyst may be added as the pure base but generally it is preferable to add it as a solution in any solvent which is inert to isocyanates for example dimethylsulphoxide or dimethylformamide. The polymerization may be inhibited at any stage by adding sufficient of an acidic substance, for example, hydrochloric acid, acetic acid, or acetyl chloride, to neutralize the basic catalyst present, either completely or in part.

By the process of this invention organic isocyanates may rapidly be polymerized to the trimeric form at atmospheric temperatures or at temperatures low enough to prevent side reactions occurring. Furthermore the products obtained are substantially pure and are not discolored. The action of prior art catalysts is in general more difficult to reproduce and often involves raising the temperature to levels such as will cause the formation of by-products and discoloration; in some cases it is dependent on the presence of small traces of water and may be inconveniently slow.

It is known that isocyanates may be used in many processes in the form of their reaction products with, for example, phenols, acetoacetic esters, malonic esters and diphenylamine. In a similar manner, the isocyanate polymers made by the process of this invention may also be used in the form of reaction products with such compounds, these reaction products behaving as free isocyanates at elevated temperatures. These reaction products may be advantageously used in place of the free polymers where long pot-life of, for example, resin lacquers therefrom is desired or where isocyanate-reactive solvents are used.

The isocyanate polymers may be used either as the substantially monomer-free practically fully converted polymer or in solution in the isocyanate from which they are derived, or in admixture with other isocyanates. Likewise they can be used in solution in organic solvents, such as chloroform, methylene dichloride, esters, ketones or benzene hydrocarbons, depending upon the particular solubility of the polymer in question.

Any monomer contained in the isocyanate polymers made according to the processes of this invention may be removed or substantially eliminated by distillation of the monomer under reduced pressure in absence or presence of the vapor of an inert liquid such as mono- or di-chlorbenzene or by precipitating the polymer from solution by addition of a second solvent in which the monomer is soluble and the polymer substantially insoluble, for example dialkyl ethers and petroleum ethers.

The isocyanate polymers and their above described reaction products have a variety of applications: as adhesives, as curing agents for resins, as components of or as curing agents for isocyanate modified polyester or polyether raw rubbers, or as isocyanates for producing special effects in both elastic and rigid cellular materials. The toxic hazard of volatile diisocyanates, for example tolylene diisocyanate, can be virtually overcome by the use of the substantially completely converted isocyanate polymer therefrom while still retaining active isocyanate groups. This is of particular value when isocyanates are used in conditions of poor ventilation.

The invention is illustrated but not limited by the following examples in which parts and percentages are by weight.

*Example 1*

A solution of 1 part of tetraethylammonium hydroxide in 46 parts of dimethyl sulphoxide, was added to 246 parts of phenyl isocyanate. After 1 minute, the temperature rose rapidly, and the mixture solidified. After 5 minutes the product was broken up under dry ether and filtered. The amount of unreacted isocyanate in the ether was found by analysis and indicated a 99% conversion of the phenyl isocyanate to triphenyl isocyanurate. The crude product, melted at 269–273° C., uncorrected, raised to 277–278° C. uncorrected after one crystallisation from ethanol. The product melted at 277.5–279° C. on admixture with authentic triphenyl isocyanurate.

*Example 2*

A solution of 1 part of tetraethyl ammonium hydroxide in 46 parts of dimethyl sulphoxide was added to 336 parts of p-tolylisocyanate. The mixture remained cool for 4 minutes and then a vigorous exothermic reaction occurred with complete solidification of the mixture, within seconds. After 10 minutes, the product was broken up under dry ether, and filtered, thus removing unreacted isocyanate. Analysis of the ether solution indicated that 99% of the p-tolylisocyanate had been converted to tri-p-tolylisocyanurate, which was identified by elementary analysis, and mixed melting point with authentic tri-p-tolyl isocyanurate.

*Example 3*

A solution of 1 part of tetraethylammonium hydroxide in 46 parts of dimethylsulphoxide was added to 626 parts of p-methoxyphenyl isocyanate. After a ten minute induction period there was a vigorous exothermic reaction, and the mixture solidified within 5 seconds. When cool, the white crystalline material, obtained in 99% of the theoretical yield, had melting point 261–265° C. and mixed melting point (with pure tri-p-methoxyphenylisocyanurate) 260–262° C.

*Example 4*

A solution of 1 part of tetraethylammonium hydroxide in 40 parts of dimethyl sulphoxide was added to 348 parts of o-methoxyphenyl isocyanate. White crystals commenced to separate after 13 hours, and, after 19 hours, analysis of the mixture indicated that 64% of the o-methoxyphenyl isocyanate had been converted to tri-o-methoxyphenyl isocyanurate. Infra-red spectrum of the product showed strong absorption bands at 5.85 and 7.05 microns, characteristic of the tri-aryl substituted isocyanurate ring.

*Example 5*

A solution of 1 part of tetraethylammonium hydroxide in 46 parts of dimethylsulphoxide was added to 460 parts of o-chlorphenyl isocyanate. Crystals commenced to separate after 1¼ hours, and, after 20 hours, the solid crystalline mass was broken up and analyzed, from which it was found that 93% of the o-chlorophenylisocyanate had been converted to tri-o-chlorophenyl isocyanurate. The product, after crystallization from ethanol, and thorough drying, melted at 224°–224.5° C.; this melting point was not depressed on admixture with authentic tri-o-chlorophenyl isocyanurate.

*Example 6*

1 part of tetraethylammonium hydroxide was added without solvent to 366.5 parts of commercial p-chlorophenyl isocyanate at the temperature of the melting point of the p-chlorophenylisocyanate. There was an immediate exothermic reaction, accompanied by complete solidification. After 30 minutes, the product was crystallized from glacial acetic acid giving white crystals which melted at 320–324° C.; this melting point was not depressed on admixture with authentic tri-p-chlorophenyl isocyanurate.

*Example 7*

A solution of 1 part of tetraethyl ammonium hydroxide in 16 parts of dimethyl sulphoxide was added to a mixture of 748.5 parts of commercial p-nitrophenyl isocyanate and 1106 parts of dry dimethyl formamide. On mixing a deep orange color developed, accompanied by a gentle heat rise. After 3 days the mixture was heated to 80° C. and a further 3 parts of tetraethylammonium hydroxide in 48 parts of dimethyl sulphoxide were added. The temperature stayed at 70° C. without heating for 15 minutes. After cooling, the product was precipitated by water, filtered, and crystallized from dioxan. The white crystals, which melted above 350° C., were identified as tri-p-nitrophenyl isocyanurate by infra-red spectrum, which showed strong absorption bands at 5.85 and 7.05 microns, characteristic of the triaryl substituted isocyanurate ring, and by elementary analysis.

*Example 8*

A solution of 1 part of benzyl-triethylammonium hydroxide in 12.5 parts of dimethyl sulphoxide was added to 407.5 parts of phenyl isocyanate. After 8 minutes, there was a rapid rise in temperature, and the mixture solidified. After a further 5 minutes, the product was washed onto a filter with anhydrous ether. Analysis of unchanged phenyl isocyanate in the filtrate indicated that 96% of the phenyl isocyanate had been converted to triphenyl isocyanurate. The crude product melted at 272–274° C., raised to 276–279° C. after one crystallization from ethanol.

*Example 9*

A solution of 1 part of tetraethylphosphonium hydroxide in 69 parts of dimethyl sulphoxide was added to 344 parts of p-tolylisocyanate. Within 30 seconds, a vigorous exothermic reaction occurred and the product solidified. After 30 minutes the product was broken up, and washed on to a filter with anhydrous petroleum ether (B.P. 40–60° C.). Analysis of the filtrate indicated that 98% of the p-tolyl isocyanate had been converted to tri-p-tolyl isocyanurate. The product, after washing with ethanol melted at 256–257° C. raised to 268–269° C. on crystallizing from aqueous ethanol. The purified product did not depress the melting point of authentic tri-p-tolylisocyanurate.

*Example 10*

A solution of 1 part of trimethylsulphonium hydroxide in 26 parts of dimethyl sulphoxide was added to 269 parts of phenyl isocyanate. A slow separation of crystals commenced after 15 minutes. After 2 hours the product was washed on to a filter with petroleum ether, and dried, yielding 62 parts of white crystals of triphenyl isocyanurate. After 1 crystallization from ethanol the product had a melting point of 279.5–281° C., and a mixed melting point of 279.5–281° C. with authentic triphenyl isocyanurate.

Example 11

1220 parts of 2:4-toluene diisocyanate were dissolved in 901 parts of dry ethyl acetate. A solution of 2 parts of tetraethyl ammonium hydroxide in 32 parts of dimethyl-sulphoxide was added at room temperature (24.5° C.). The mixture was stirred vigorously and the temperature and isocyanate content of the mixture measured at intervals.

| Time after mixing in minutes | Temperature, °C. | Isocyanate content in milli-equivalents/g. |
|---|---|---|
| 0 | 24.5 | 6.72 |
| 10 | 38 | 5.80 |
| 20 | 38 | 3.93 |
| 30 | 29.5 | 3.27 |

After 33 minutes 22 parts of acetyl chloride were added to neutralize the catalyst. The syrupy product was diluted with petroleum ether when a white amorphous powder was precipitated. This was collected by filtration, and dried. On heating to about 80° C. it became somewhat sticky and coagulated. The solid melted at 170–240° C. and analyzed as containing one gram equivalent of isocyanate in 238 grams. Its infra-red absorption spectrum showed intense bands at 5.85 and 7.05 microns, typical of compounds containing an isocyanurate ring, and at 4.35 microns, due to the isocyanate groups.

Example 12

A solution of 1 part of tetraethylammonium hydroxide in 51 parts of dimethyl sulphoxide was added to a solution of 893 parts of chlorophenylene-2:4-diisocyanate in 2011 parts of dry ethyl acetate, at room temperature (23.5° C.). The mixture was stirred, and the temperature and isocyanate content were measured at intervals.

| Time after mixing in minutes | Temperature, °C. | Isocyanate content in milli-equivalents/g. |
|---|---|---|
| 0 | 23.5 | 3.24 |
| 5 | 25.0 | 3.05 |
| 15 | 29.5 | 2.81 |
| 25 | 35.5 | 2.54 |
| 41 | 31.5 | 2.27 |
| 04 | 28.5 | 2.01 |

The reaction was terminated after 75 minutes by the addition of 4 parts of benzoyl chloride. The product was precipitated as a light brown amorphous solid, by the addition of anhydrous di-n-butyl ether, filtered and dried. The solid, which did not melt below 320° C., analyzed as containing one gram equivalent of isocyanate in 732 grams. The infra-red absorption spectrum of the product showed intense bands at 5.85 and 7.05 microns, characteristic of compounds containing the isocyanurate ring, and at 4.35 microns, characteristic of the isocyanate group.

Example 13

A solution of 1 part of tetraethyl ammonium hydroxide in 14 parts of dimethyl sulphoxide was added to 75 parts of n-hexadecyl isocyanate. After 4 days, 37 parts of a solid product were obtained. Crystallization from acetone gave small white crystals melting at 58–58.5° C. The infra-red spectrum of the product was characteristic of the isocyanurate ring, and the structure tri-n-hexadecyl isocyanurate, was also indicated by elementary analysis.

Example 14

41 parts of phenyl isocyanate were added to 1 part of anhydrous tri-α:α'-dipyridyl ferrous dihydroxide, in the absence of a solvent. After 24 days, the pink solution was diluted with anhydrous petroleum ether and 6 parts of a pink powder were precipitated. The crude product melted at 238–244° C. One crystallization from ethanol raised the melting point to 273–274° C., undepressed on admixture with authentic triphenyl isocyanurate.

What we claim is:

1. A process for the manufacture of an organic isocyanurate which comprises polymerizing a mixture consisting essentially of organic isocyanate selected from the group consisting of monocarbocyclic aromatic and alkyl mono- and polyisocyanates substituted only with lower alkyl, lower alkoxy, halogen and nitro groups, and at least one polymerization catalyst selected from the group consisting of tri-α,α'-dipyridyl ferrous dihydroxide, quaternary hydroxides derived from nitrogen, phophorus, arsenic and antimony and ternary hydroxides derived from sulfur and selenium in which the four substituents of the nitrogen, phosphorus, arsenic and antimony and the three substituents of the sulfur and selenium atoms are selected from the class consisting of lower alkyl, mono-cyclic aryl and monocyclic aralkyl groups.

2. A process for the manufacture of an isocyanurate as set forth in claim 1 in which said polymerization catalyst is tetraethylammonium hydroxide.

3. A process for the manufacture of an isocyanurate as set forth in claim 1 in which said polymerization catalyst is benzyltrimethylammonium hydroxide.

4. A process for the manufacture of an isocyanurate as set forth in claim 1 in which said polymerization catalyst is tetraethylphosphonium hydroxide.

5. A process for the manufacture of an isocyanurate as set forth in claim 1 in which said polymerization catalyst is trimethylsulphonium hydroxide.

6. A process for the manufacture of an isocyanurate as set forth in claim 1 in which said polymerization catalyst is tri-dipyridyl-ferrous dihydroxide.

7. A process for the manufacture of an isocyanurate as set forth in claim 1 in which said polymerization catalyst is present in an amount of from 0.0001 to 5.0 percent by weight of the isocyanate used.

8. A process for the manufacture of an isocyanurate as set forth in claim 7 in which the process is carried out at atmospheric temperature.

9. A process for the manufacture of an isocyanurate as set forth in claim 1 in which the process is conducted in the presence of an inert solvent.

References Cited in the file of this patent

UNITED STATES PATENTS

| 2,671,082 | Stallmann | Mar. 2, 1954 |
| 2,683,144 | Balon | July 6, 1954 |
| 2,801,244 | Balon | July 30, 1957 |
| 2,866,801 | Himel et al. | Dec. 30, 1958 |
| 2,866,802 | Graham | Dec. 30, 1958 |

FOREIGN PATENTS

| 703,229 | Germany | Mar. 4, 1941 |
| 512,209 | Canada | Apr. 26, 1955 |
| 773,897 | Great Britain | May 1, 1957 |

OTHER REFERENCES

Bergmann: The Chemistry of Acetylene and Related Compounds, page 80, Interscience Publishers Inc., N.Y. (1948).

Monsanto Technical Bulletin No. P–125, page 5 (1951).

Degering: "An Outline of Organic Chemistry" (6th edition), Barnes and Noble (1951), page 144.